United States Patent
Mukai et al.

(10) Patent No.: US 7,042,179 B2
(45) Date of Patent: May 9, 2006

(54) ELECTRIC POWER STEERING APPARATUS

(75) Inventors: Yoshinobu Mukai, Wako (JP); Yasuhiro Nakano, Wako (JP); Masanori Takagi, Wako (JP); Hiroaki Horii, Wako (JP); Osamu Tsurumiya, Wako (JP); Fumihiro Morishita, Wako (JP); Takashi Kuribayashi, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 0 days.

(21) Appl. No.: 11/062,295

(22) Filed: Feb. 16, 2005

(65) Prior Publication Data

US 2005/0231145 A1 Oct. 20, 2005

(30) Foreign Application Priority Data

Apr. 20, 2004 (JP) .............................. 2004-124212

(51) Int. Cl.
*H02P 7/00* (2006.01)

(52) U.S. Cl. ...................... 318/432; 318/434; 318/701; 701/41; 180/422; 180/446

(58) Field of Classification Search ................ 318/432, 318/439, 635, 701, 434; 180/422, 446; 701/41
See application file for complete search history.

(56) References Cited

U.S. PATENT DOCUMENTS

| | | | |
|---|---|---|---|
| 4,869,334 A * | 9/1989 | Marumoto et al. | 180/446 |
| 4,934,473 A * | 6/1990 | Fushimi et al. | 180/446 |
| 4,945,298 A * | 7/1990 | Nakashima | 318/635 |
| 5,236,335 A * | 8/1993 | Takeuchi et al. | 180/446 |
| 5,457,632 A * | 10/1995 | Tagawa et al. | 701/43 |
| 5,504,679 A * | 4/1996 | Wada et al. | 701/41 |
| 5,507,359 A * | 4/1996 | Wada | 180/446 |
| 5,740,040 A * | 4/1998 | Kifuku et al. | 701/41 |
| 5,998,952 A * | 12/1999 | McLaughlin et al. | 318/432 |
| 6,278,922 B1 * | 8/2001 | Nishiwaki | 701/41 |
| 6,404,156 B1 * | 6/2002 | Okanoue et al. | 318/432 |
| 6,484,841 B1 * | 11/2002 | Takai et al. | 180/422 |
| 6,499,557 B1 * | 12/2002 | Takai et al. | 180/422 |
| 6,542,800 B1 * | 4/2003 | Kawazoe et al. | 701/41 |
| 6,577,030 B1 * | 6/2003 | Tominaga et al. | 310/68 B |
| 6,675,928 B1 * | 1/2004 | Takai et al. | 180/422 |
| 6,681,884 B1 * | 1/2004 | Shimizu et al. | 180/422 |
| 6,801,012 B1 * | 10/2004 | Islam et al. | 318/701 |
| 6,891,283 B1 * | 5/2005 | Fukumoto et al. | 307/10.1 |
| 6,913,109 B1 * | 7/2005 | Kodama et al. | 180/446 |
| 6,927,548 B1 * | 8/2005 | Nishizaki et al. | 318/432 |
| 2002/0013647 A1 * | 1/2002 | Kawazoe et al. | 701/41 |
| 2003/0141138 A1 * | 7/2003 | Shimizu et al. | 180/422 |
| 2004/0182640 A1 * | 9/2004 | Katou et al. | 180/446 |
| 2004/0189240 A1 * | 9/2004 | Islam et al. | 318/701 |
| 2004/0206571 A1 * | 10/2004 | Nishizaki et al. | 180/446 |

FOREIGN PATENT DOCUMENTS

JP 3216491 8/2001

* cited by examiner

*Primary Examiner*—Paul Ip
(74) *Attorney, Agent, or Firm*—Hamre, Schumann, Mueller & Larson, P.C.

(57) ABSTRACT

An electric power steering apparatus using a brushless motor is disclosed. The electric power steering apparatus has a microcomputer for calculating a target current to the brushless motor on the basis of a torque signal outputted from a steering torque detecting part. The microcomputer has a table stored in ROM. The microcomputer calculates the angular position of the brushless motor by referring to the table on the basis of a signal outputted by a resolver.

5 Claims, 11 Drawing Sheets

ELECTRIC POWER STEERING APPARATUS

FIELD OF THE INVENTION

This invention relates to an electric power steering apparatus for applying force from an electric motor to a steering mechanism to lighten the steering force needed from a driver.

BACKGROUND OF THE INVENTION

An electric power steering apparatus reduces the steering force needed from a driver by drive-controlling an electric motor with a motor drive control part on the basis of a steering torque signal outputted by a steering torque detecting part and a vehicle speed signal outputted by a vehicle speed detecting part. Electric power steering apparatuses that use a brushless motor as the electric motor are known.

With an electric power steering apparatus that uses a brushless motor, because there is no dropping or fluctuation of motor output due to a voltage drop between brushes and a commutator, it is possible to obtain a stable auxiliary steering force. Because the inertia moment of the motor is small compared to that of a motor with brushes, a good steering feeling can be obtained at high straight-line speeds and when the steering wheel is turned back from one direction to the other.

However, when a brushless motor is used as the motor, instead of brushes and a commutator, it becomes necessary for the amount of motor current to be controlled in correspondence with the angle of the motor (the angular position of the rotor). For this, a motor angle detecting part for detecting the angle of the motor (the angular position of the rotor) and a motor current detecting part are provided, and PWM drive control of the brushless motor is carried out on the basis of output signals from the motor angle detecting part and the motor current detecting part.

The motor angle detecting part comprises for example a resolver and an RD (resolver digital) convertor part. Signals from the resolver are supplied continuously to the RD convertor part. The RD convertor part calculates the angle of the rotor with respect to the stator in the brushless motor (the rotor angular position) $\theta$, and outputs a signal corresponding to this calculated angle $\theta$.

The RD convertor part calculates an angular velocity $\omega$ of the rotor with respect to the stator in the brushless motor, and outputs a signal corresponding to the calculated angular velocity $\omega$.

An apparatus that uses a resolver and an RD convertor part to detect the angle of the motor (the angular position of the rotor) like this is disclosed in Japanese Patent No. 3216491.

When an RD convertor part for obtaining the angular position of a rotor on the basis of output signals from a resolver like this is employed in an electric power steering apparatus, there has been the problem that the RD convertor part is expensive and raises the cost of the apparatus. Also, when the RD convertor is performing angle calculation with an extremely short period and for example spike noise intrudes, because the computation itself is reset (computation is interrupted) there is a possibility of the driver being subjected to an incongruous feeling.

Thus, an electric power steering apparatus has been awaited with which calculation of the motor angle (angular position of the rotor) from the outputs of a resolver is achieved with a device that is low-cost and does not easily suffer influences of noise.

SUMMARY OF THE INVENTION

To achieve the above-mentioned object and other objects, the invention provides an electric power steering apparatus including: a brushless motor for applying a torque to a steering mechanism; angular position detecting means for detecting an angular position of the brushless motor; steering input detecting means for detecting a steering input; control means for calculating a target current on the basis of at least a signal from the steering input detecting means; and motor driving means for supplying current to the brushless motor, wherein the calculation of the angular position is carried out with reference to a predetermined table provided in the control means.

Because the angular position of the brushless motor is obtained by control means consisting of a microcomputer on the basis of a table stored in ROM provided in the control means, there is unlikely to be any affect of noise, there is less possibility of calculation being interrupted, and incongruous steering feelings can be reduced. Because an RD convertor part is unnecessary, the construction can be made cheaper than in related art.

Preferably, an electric power steering apparatus according to the invention further includes second control means additional to the first control means, the second control means performs the same angular position calculation as the first control means, and any abnormality is detected by a value calculated by the first control means and a value calculated by the second control means being compared. In this case, because the output difference between the first control means and the second control means is extremely small, and the margin for error of the two signals can be made small, the precision of abnormality detection increases.

Also, in an electric power steering apparatus according to the invention further including second control means additional to the first control means, the second control means performing the same angular position calculation as the first control means, the first control means and the second control means may preferably have direction prohibiting means for restricting rotation of the brushless motor on the basis of a steering input of a driver. In this case, even when one of the first control means and the second control means has become abnormal, it is possible for certain direction prohibition to be carried out by the other. Also, a circuit for detecting abnormality of the first control means and the second control means becomes unnecessary, and a simple circuit construction can be adopted.

Also, in this invention, preferably, the angular position detecting means is a resolver, there are further provided sample-hold circuits for sample-holding outputs from the resolver, and the first control means or the second control means outputs a reference clock pulse to the resolver and a sample-hold timing pulse to the sample-hold circuits. In this case, it is possible to output a sample-hold timing correctly synchronized with the peaks of an excitation signal. Also, the timing can be changed freely with the sample-hold timing remaining synchronized correctly with the peaks of the excitation signal.

BRIEF DESCRIPTION OF THE DRAWINGS

Certain preferred embodiments of the present invention will now be described with reference to the accompanying drawings, in which.

DETAILED DESCRIPTION OF THE PREFERRED EMBODIMENTS

Figure 1:
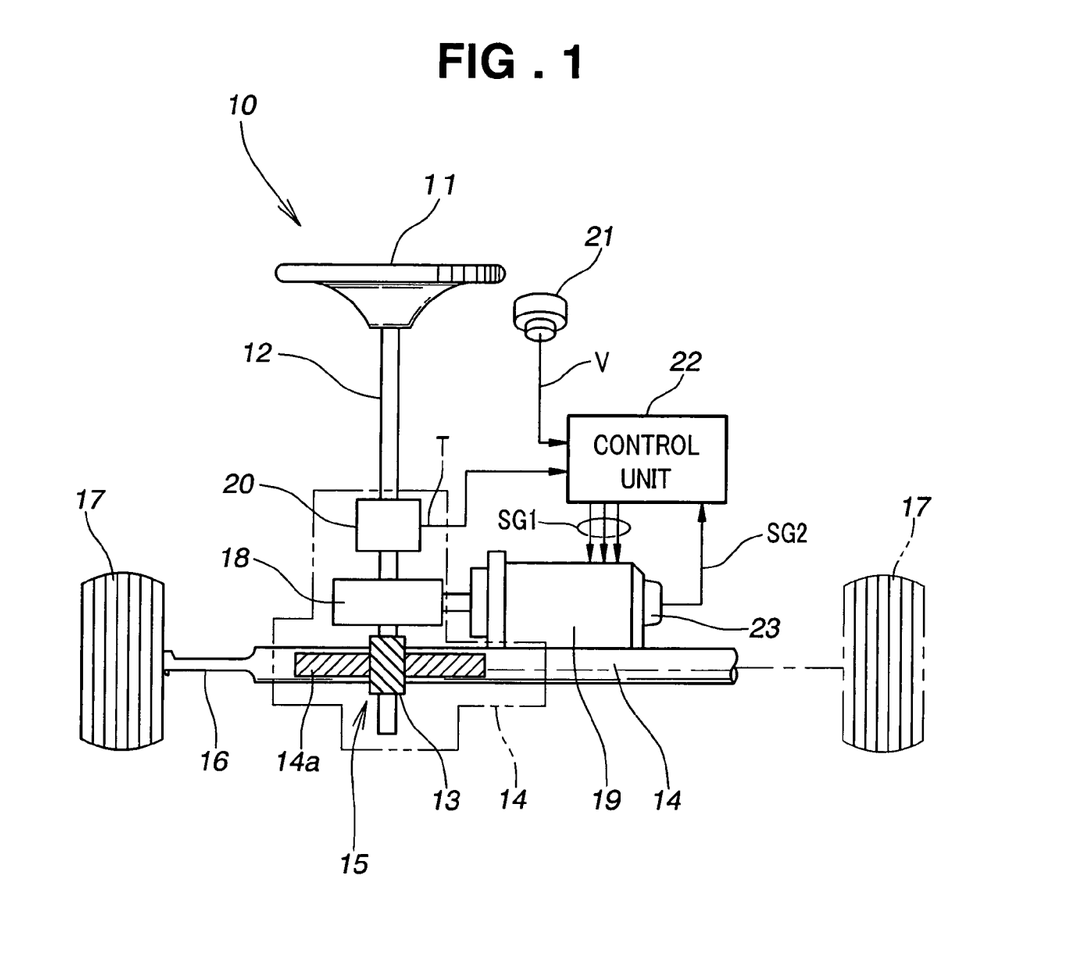
FIG. 1 is an overall construction view of an electric power steering apparatus according to the invention.

The overall construction of an electric power steering apparatus according to the invention will be described on the basis of FIG. 1 through FIG. 4. An electric power steering apparatus 10 shown in FIG. 1 is constructed to apply an assisting steering force (steering torque) to a steering shaft 12 connected to a steering wheel 11.

A top end of the steering shaft 12 is connected to the steering wheel 11, and a bottom end is connected to a pinion gear 13. The pinion gear 13 is connected to a rack shaft 14 having a rack gear 14a for meshing with the pinion gear 13. The pinion gear 13 and the rack gear 14a constitute a rack and pinion mechanism 15. Front wheels 17, 17 are connected to the ends of the rack shaft 14 by tie rods 16, 16.

A power transmitting mechanism 18 is mounted on the steering shaft 12, and the power transmitting mechanism 18 is connected to a brushless motor 19.

The brushless motor 19 outputs a turning force (torque) for supplementing the steering torque, and applies this turning force to the steering shaft 12 via the power transmitting mechanism 18.

A steering torque detecting part 20 is provided on the steering shaft 12. The steering torque detecting part 20 detects a steering torque applied to the steering shaft 12 by a driver turning the steering wheel 11. The reference number 21 denotes a vehicle speed detecting part for detecting the speed of the vehicle.

A control unit 22 consisting of a computer outputs a drive control signal SG1 for controlling rotation of the brushless motor 19 on the basis of a steering torque signal T outputted from the steering torque detecting part 20 and a vehicle speed signal V outputted from the vehicle speed detecting part 21.

The brushless motor 19 has a motor angle detecting part 23 consisting of a resolver. An angle signal SG2 outputted from the motor angle detecting part 23 is fed back to the control unit 22.

The rack and pinion mechanism 15, the power transmitting mechanism 18 and the steering torque detecting part 20 are housed in a gearbox 24 shown with broken lines.

The electric power steering apparatus 10 is made by adding the steering torque detecting part 20, the vehicle speed detecting part 21, the control unit 22, the brushless motor 19 and the power transmitting mechanism 18 to the apparatus of an ordinary steering system.

When during travel of the vehicle the driver turns the steering wheel 11 to change the direction of travel, a turning force originating in the steering torque applied to the steering shaft 12 is converted via the rack and pinion mechanism 15 into a linear motion in the axial direction of the rack shaft 14, and turns the front wheels 17, 17 via the tie rods 16, 16. At this time, the steering torque detecting part 20 detects the steering torque and converts it into an electrical steering torque signal T, and outputs this steering torque signal T. The outputted steering torque signal T is inputted to the control unit 22.

The vehicle speed detecting part 21 detects the speed of the vehicle and converts it into a vehicle speed signal V, and outputs this vehicle speed signal V. The vehicle speed signal V is inputted to the control unit 22.

The control unit 22 produces a motor current for driving the brushless motor 19 on the basis of the steering torque signal T and the vehicle speed signal V. The brushless motor 19 applies an auxiliary turning force to the steering shaft 12 via the power transmitting mechanism 18. By the brushless motor 19 being driven in this way, the steering force that the driver needs to apply to the steering wheel 11 is lightened.

Figure 2:
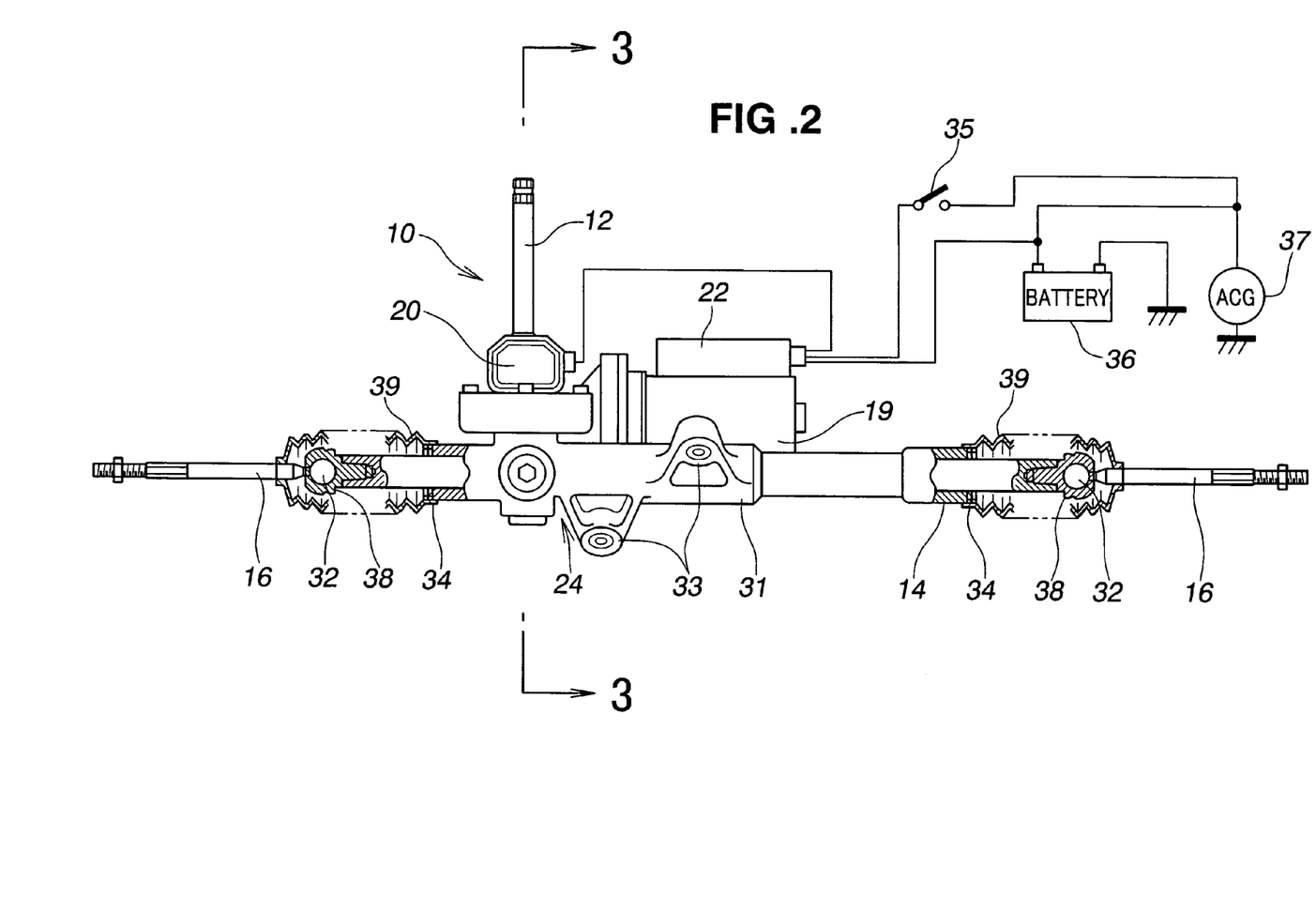
FIG. 2 is a view showing the main parts of the mechanical construction and the specific construction of the electrical system of the electric power steering apparatus shown in FIG. 1.

As shown in FIG. 2, the rack shaft 14 is housed slidably in its axial direction inside a tubular housing 31 disposed in the width direction of the vehicle. Ball joints 32, 32 are screwed into the ends of the rack shaft 14, which project from the housing 31, and the left and right tie rods 16 are connected to these ball joints 32, 32. The housing 31 has a bracket 33 for mounting it to a vehicle body (not shown) and stoppers 34 provided at its ends.

The reference number 35 denotes an ignition switch, 36 a vehicle battery, and 37 an a.c. generator (ACG) serving the vehicle engine. The a.c. generator 37 starts generating when the vehicle engine starts.

The control unit 22 is provided on the brushless motor 19. The reference number 38 denotes rack ends for abutting with the stoppers 34 when the rack shaft 14 moves. Dust seal boots 39 protect the inside of the gearbox 24 from water, mud and dust.

Figure 3:
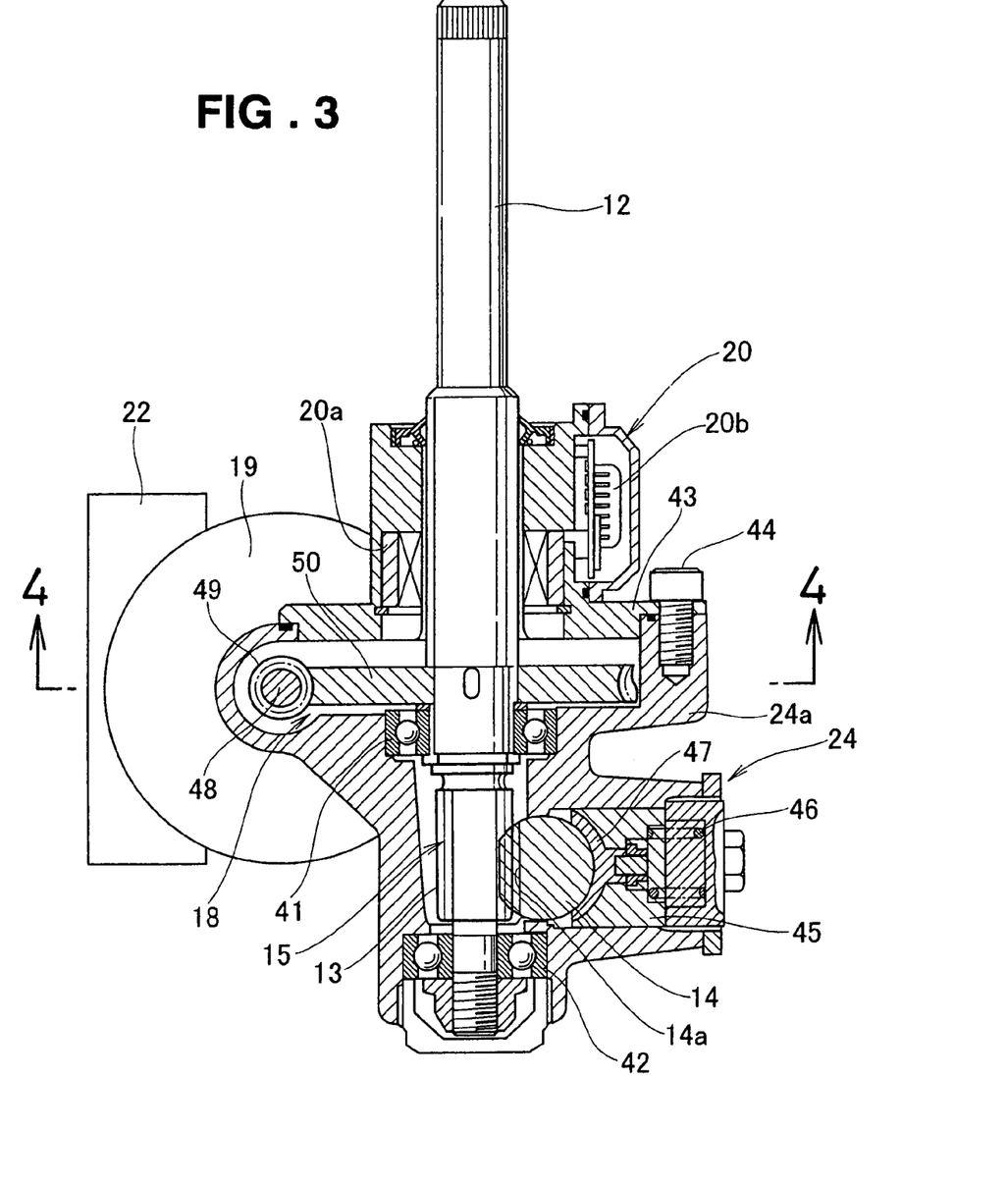
FIG. 3 is a sectional view taken along line 3—3 of FIG. 2.

FIG. 3 shows a specific construction of a structure supporting the steering shaft 12 and of the steering torque detecting part 20, the power transmitting mechanism 18, and the rack and pinion mechanism 15.

The steering shaft 12 is rotatably supported by two bearings 41, 42 in a housing 24a constituting a part of the gearbox 24. The rack and pinion mechanism 15 and the power transmitting mechanism 18 are housed inside the housing 24a. The steering torque detecting part 20 is mounted on an upper part of the housing 24a. A top opening of the housing 24a is closed by a lid 43. The lid 43 is fixed with bolts 44. The pinion gear 13 mounted on the bottom end of the steering shaft 12 is positioned between the bearings 41 and 42.

The rack shaft 14 is guided by a rack guide 45 and pressed against the pinion gear 13 by a holding member 47 urged by a compression spring 46.

The power transmitting mechanism 18 is formed by a worm gear 49 fixed to a transmission shaft 48 connected to the output shaft of the brushless motor 19 and a worm wheel 50 fixed to the steering shaft 12.

The steering torque detecting part 20 comprises a steering torque detecting sensor 20$a$ mounted around the steering shaft 12 and an electronic circuit 20$b$ for electrically processing a detection signal outputted from this steering torque detecting sensor 20$a$. The steering torque detecting sensor 20$a$ is mounted on the lid 43.

Figure 4:
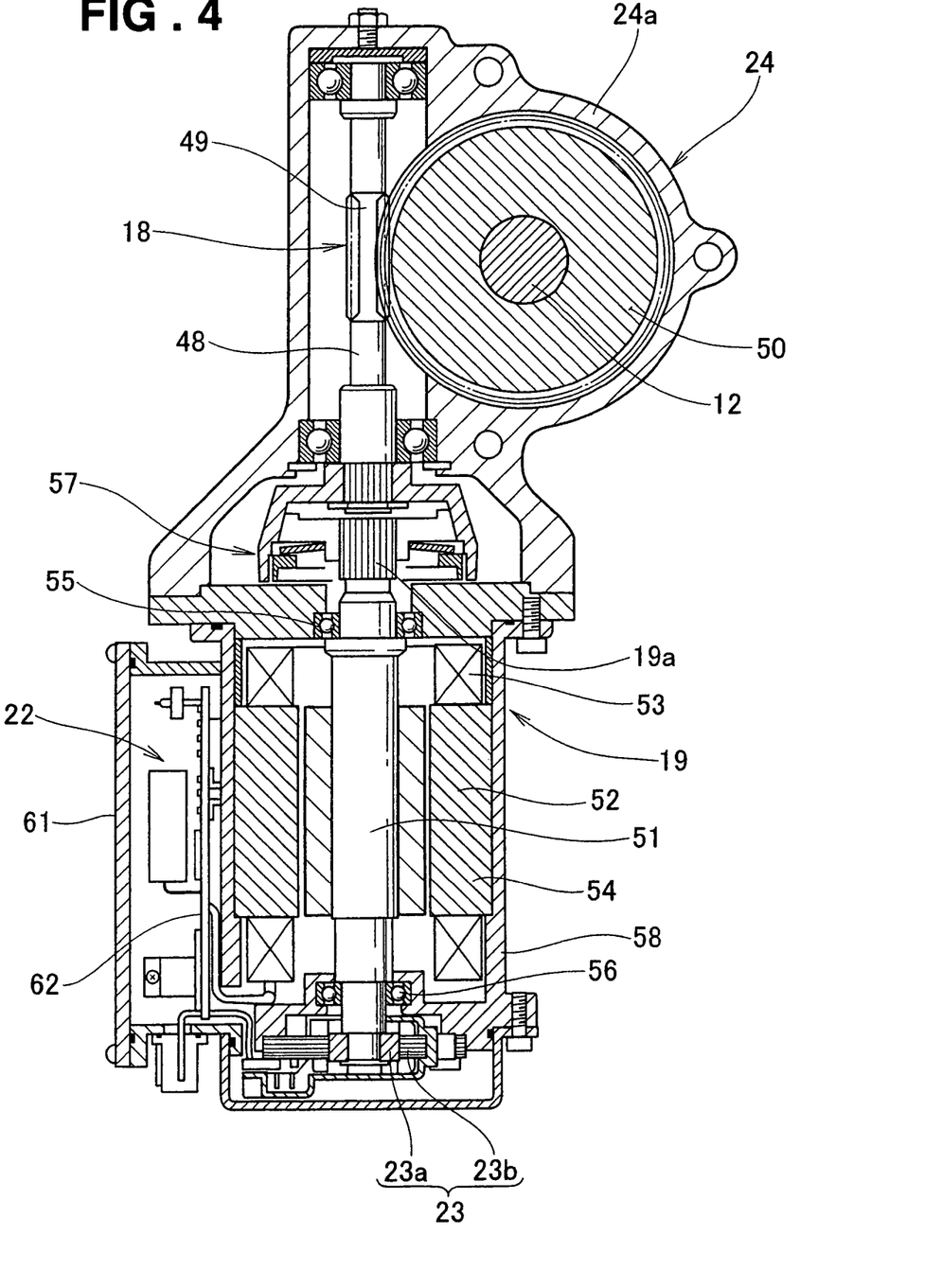
FIG. 4 is a sectional view taken along line B—B of FIG. 3.

FIG. 4 shows the construction of the brushless motor 19 and the control unit 22.

The brushless motor 19 has a rotor 52 formed of permanent magnets fixed to a rotating shaft 51 and a stator 54 disposed around the rotor 52. The stator 54 has stator windings 53. The rotating shaft 51 is rotatably supported by two bearings 55, 56. A front end of the rotating shaft 51 constitutes an output shaft 19$a$ of the brushless motor 19. The output shaft 19$a$ is connected via a torque limiter 57 to the transmission shaft 48 so that power is transmitted between the two. The worm gear 49 is formed on the transmission shaft 48. The worm wheel 50 meshes with the worm gear 49.

The above-mentioned motor angle detecting part (resolver) 23 for detecting the angle of the rotor 52 of the brushless motor 19 (the angular position of the rotor) is mounted at the rear end of the rotating shaft 51. The motor angle detecting part 23 is made up of a rotor 23$a$ fixed to the rotating shaft 51 and a detecting device 23$b$ for detecting the angle of this rotor 23$a$ using a magnetic effect.

The constituent parts of the brushless motor 19 mentioned above are housed in a motor case 58.

Figure 5:
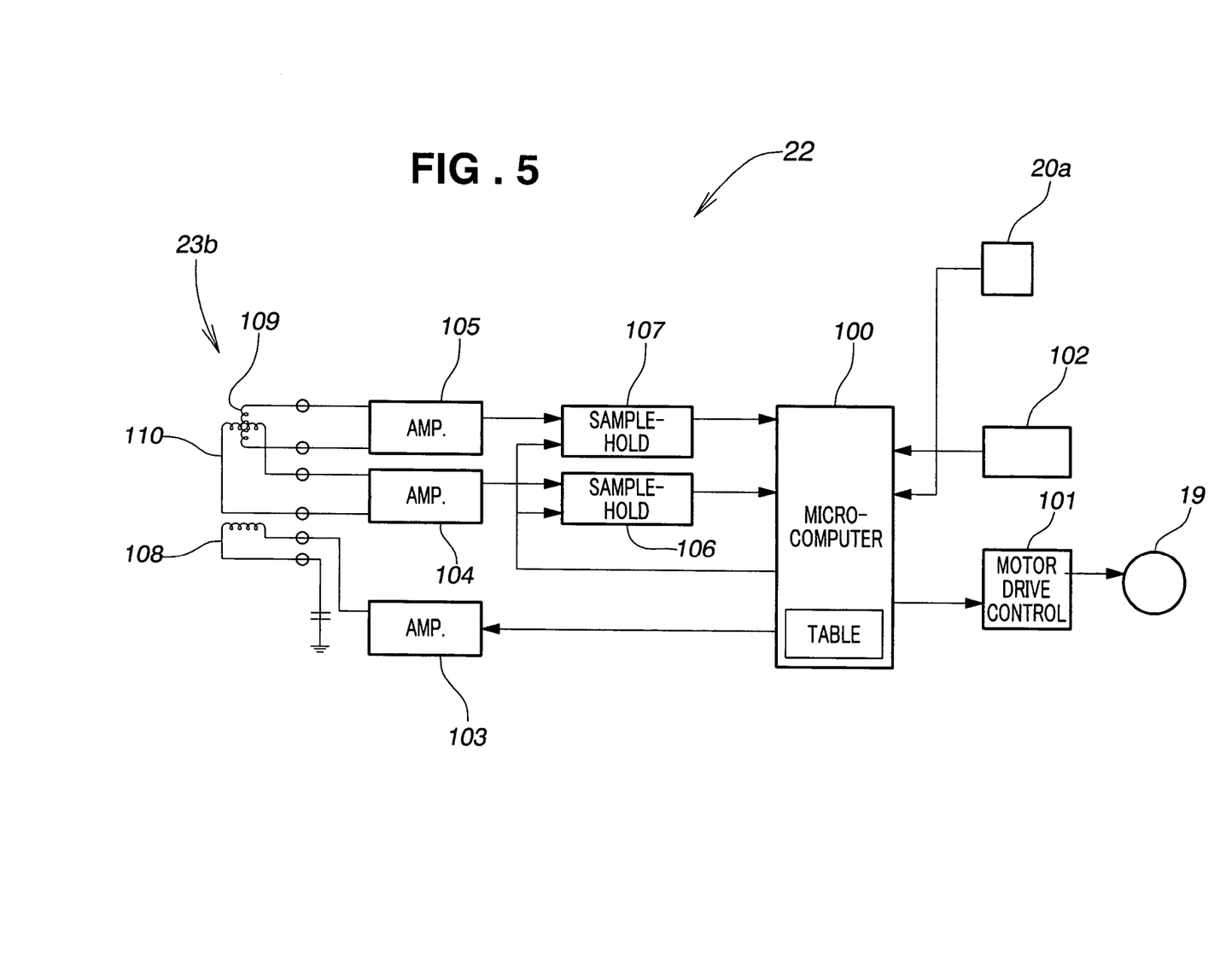
FIG. 5 is an electrical block diagram of a control unit in an electric power steering apparatus according to the first preferred embodiment of the invention.

FIG. 5 is an electrical block diagram of a control unit 22 according to the first preferred embodiment. The control unit 22 has a microcomputer (control means) 100, a motor drive control part 101 and a current detecting part 102.

The control unit 22 amplifies outputs of the detecting device 23$b$ with amplifying parts 104, 105 and samples them using sample-hold circuits 106, 107. The motor drive control part 101 drives the motor with switching devices.

The rotor 23$a$ (see FIG. 4) of the motor angle detecting part 23 is mounted on the same shaft as the rotor of the brushless motor 19, and the detecting device 23$b$ of the motor angle detecting part 23 is made up of an exciting coil 108, a sin output coil 109, and a cos output coil 110 disposed around this rotor 23$a$. The rotor 23$a$ is formed in an approximate + shape in cross-section when cut in a plane perpendicular to the rotating shaft 51, and as it rotates (as the rotor rotates), output values of the sin output coil 109 and the cos output coil 110 change. From these output values of the sin output coil 109 and the cos output coil 110, an angle $\theta$ can be obtained.

A reference signal (voltage) given by for example sin $\omega t$ ($\omega$: angular frequency, t: time) is applied to the exciting coil 108 from the microcomputer 100 via an amplifier 103.

When the reference signal is inputted to the exciting coil 108 from the microcomputer 100, the sin output coil 109 and the cos output coil 110 output a sin signal (voltage) given by sin ($\omega t$-$\theta$) and a cos signal (voltage) given by cos ($\omega t$-$\theta$).

The sin signal from the sin output coil 109 and the cos signal from the cos output coil 110 are amplified by the respective amplifiers 105, 104 and then sample-held by the sample-hold circuits 107, 106 and inputted to the microcomputer 100. The sample-hold timing at which sample-holding is carried out is determined by a signal outputted from the microcomputer 100.

The microcomputer 100 has for example a CPU, RAM and ROM. A relationship between the values (digital data) of the sin signal and the cos signal and the rotor angular position $\theta$ is stored in the ROM in the form of a table. The microcomputer 100 refers to the reference signal outputted to the exciting coil 108 and samples the signal outputted from the sin output coil 109 and the signal outputted from the cos output coil 110 with the sample-hold circuits and A/D-converts them to obtain a sin signal and a cos signal. Referring to the table held in the ROM, it reads out a rotor angular position $\theta$ corresponding to the instantaneous values of the sin signal and the cos signal. By this means, it is possible to calculate the rotor angular position $\theta$ of the motor.

The microcomputer 100 determines a target current value of the brushless motor 19 in correspondence with the steering torque detected by the steering torque detecting sensor 20$a$ and the vehicle speed detected by the vehicle speed detecting part 21 (see FIG. 1). It determines target current values of the different phases (U-phase, V-phase, W-phase) of the brushless motor 19 corresponding with the rotor angular position $\theta$ detected as described above. On the basis of those target current values, it generates PWM control signals and inputs the generated PWM control signals to the motor drive control part 101. On this basis, currents corresponding to the PWM control signals are supplied to the different phases of the brushless motor 19 from the motor drive control part 101, and a torque needed for steering assistance is produced by the brushless motor 19.

Thus, in this first preferred embodiment, the rotor angular position $\theta$ of the brushless motor 19 is detected on the basis of a sin signal and a cos signal by the microcomputer 100 alone. As a result, the rotor angular position $\theta$ of the brushless motor can be detected without circuit devices that are expensive and liable to be influenced by noise, such as an R/D-convertor, being necessary, and the cost of the electric power steering apparatus can be made low and its steering feel can be improved.

Figure 6:
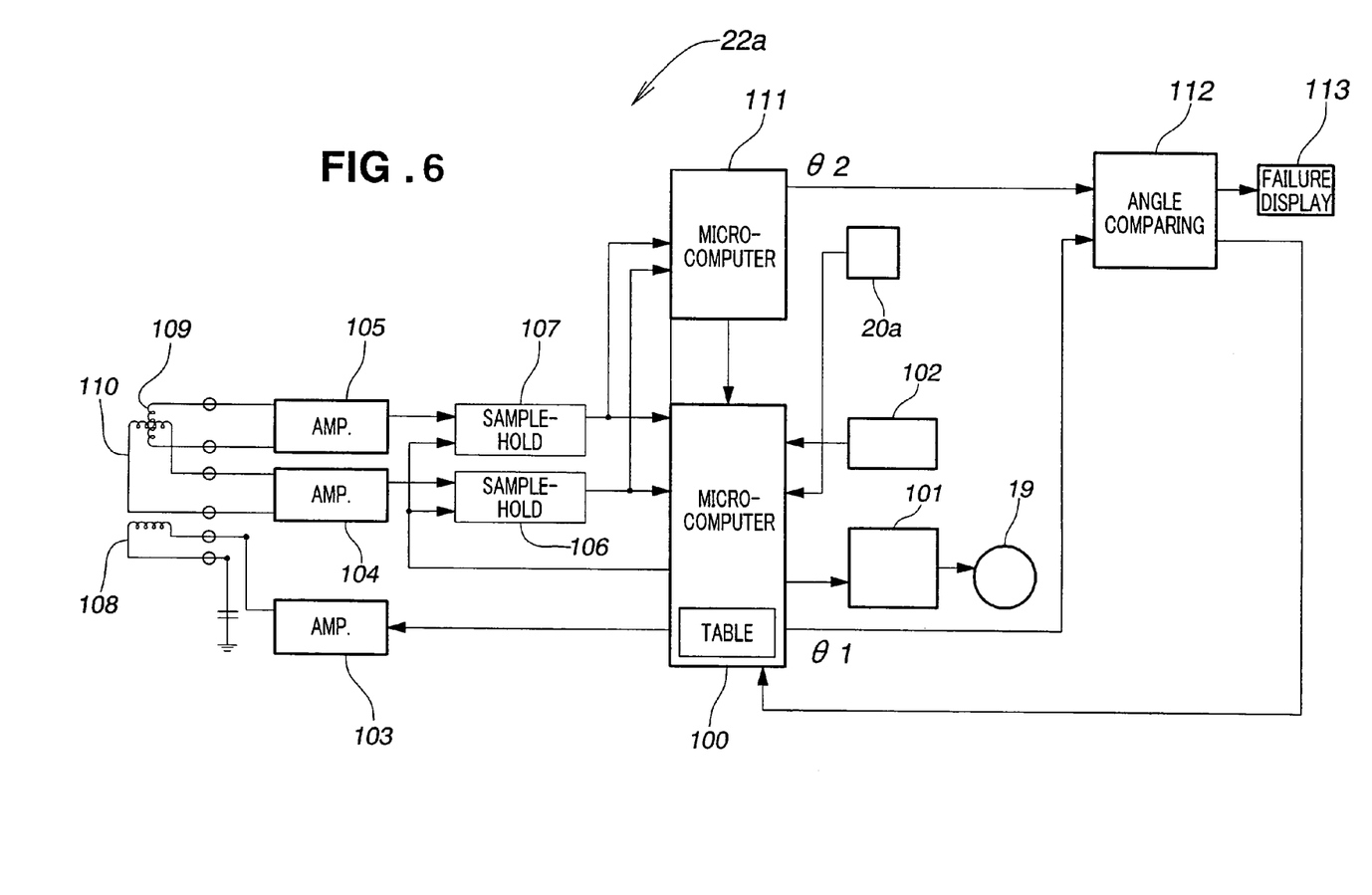
FIG. 6 is an electrical block diagram of a control unit in an electric power steering apparatus according to a second preferred embodiment of the invention.

Next, a control unit of an electric power steering apparatus according to a second preferred embodiment of the invention will be described, on the basis of FIG. 6 and FIG. 7. The control unit 22$a$ of this second preferred embodiment includes a microcomputer (second control means) 111 additional to the microcomputer 100 shown in FIG. 5, and an angle comparing part 112. In the description of the second preferred embodiment, parts the same as parts in the control unit 22 of the first preferred embodiment shown in FIG. 5 have been given the same reference numerals and will not be described again.

The second microcomputer 111 has for example a CPU, RAM and ROM, like the first microcomputer 100 (first control means).

A relationship between values of a sin signal and values of a cos signal (digital data) and the rotor angular position $\theta$ is stored in the ROM in the form of a table. The second microcomputer 111 samples the signal outputted from the sin output coil 109 and the signal outputted from the cos output coil 110 with the sample-hold circuits 107, 106 and A/D-converts them to obtain a sin signal and a cos signal. It then refers to the table stored in ROM and reads out a rotor angular position $\theta$ corresponding to the instantaneous values of the sin signal and the cos signal. By this means, it calculates the angular position of the rotor of the motor. It then outputs a signal $\theta 2$ pertaining to the calculated rotor angular position to the angle comparing part 112.

The angle comparing part 112 compares a rotor angular position signal $\theta 1$ outputted from the first microcomputer 100 with the rotor angular position signal $\theta 2$ outputted from the second microcomputer 111, and outputs 1 when $\theta 1$ and θ2 are different and zero when they are approximately equal as a signal to the first microcomputer 100 and a failure display part 113. When the signal outputted from the angle comparing part 112 is zero the first microcomputer 100 remains in the same state, and when the signal outputted from the angle comparing part 112 is 1 it outputs a signal to the motor drive control part 101 such that the output of the motor gradually decreases.

Figure 7:
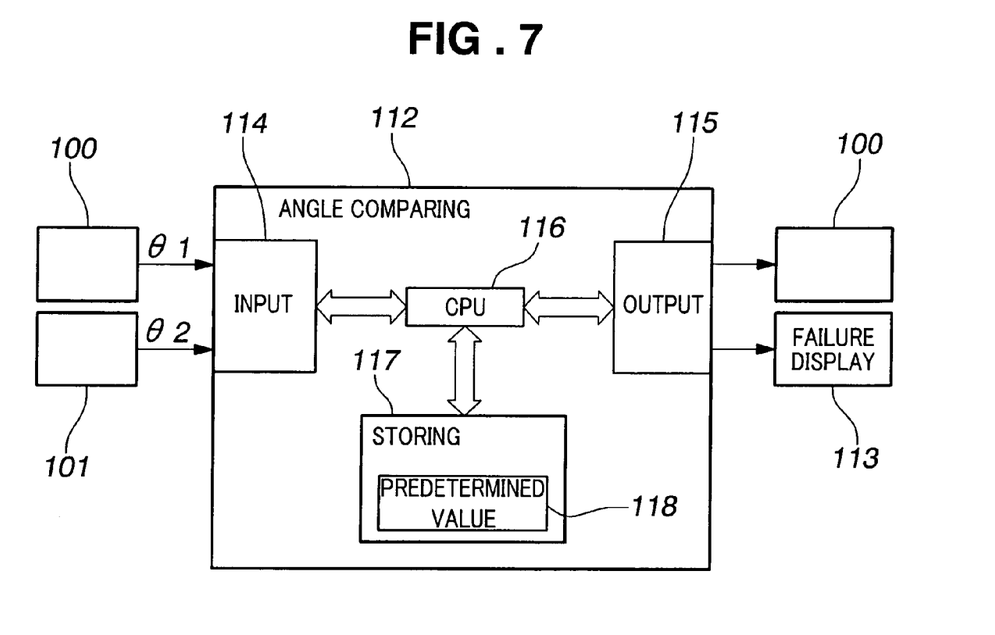
FIG. 7 is a block diagram of an angle comparing part shown in FIG. 6.

FIG. 7 shows details of the angle comparing part 112. The angle comparing part 112 has an input part 114, an output part 115, a CPU 116 and a storing part 117. This angle comparing part 112 compares the rotor angular position θ1 inputted from the first microcomputer 100 with the rotor angular position θ2 inputted from the second microcomputer 111, and if the difference between them is less than a predetermined value it determines that all is normal and outputs a normal value signal, for example zero, to the first microcomputer 100 and the failure display part 113, and if the difference is greater than the predetermined value it determines that there has been a failure and outputs a failure signal, for example 1, to the first microcomputer 100 and the failure display part 113. The predetermined value here is pre-stored in a storage area 118 of the storing part 117.

The failure display part 113 is a device for displaying whether there has been a failure of the first microcomputer 100 or the second microcomputer 111, and for example has a light-emitting diode that lights on the basis of the signal inputted from the angle comparing part 112. This light-emitting diode for example remains unlit when the signal from the angle comparing part 112 is zero and lights up when the input from the angle comparing part 112 is 1. Accordingly, when the light-emitting diode is lit it can be inferred that one or both of the first microcomputers 100, 111 has failed.

Figure 8:
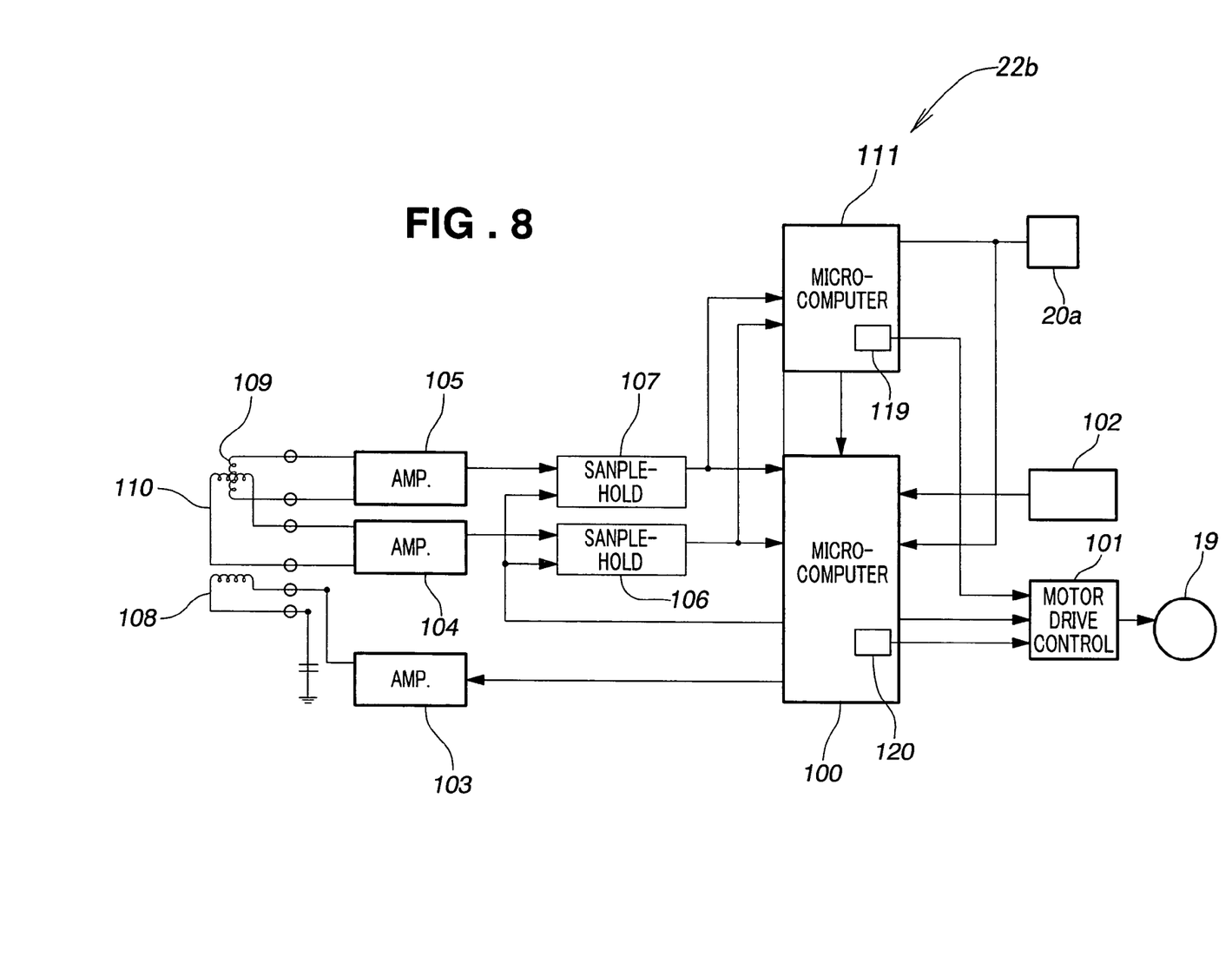
FIG. 8 is an electrical block diagram of a control unit in an electric power steering apparatus according to a third preferred embodiment of the invention.

Next, a control unit of an electric power steering apparatus according to a third preferred embodiment will be described, on the basis of FIG. 8 and FIG. 9. The control unit 22b of this third preferred embodiment, like the second preferred embodiment shown in FIG. 7, includes two microcomputers. Parts the same as parts of the control unit 22 of the first preferred embodiment shown in FIG. 5 have been given the same reference numerals and will not be described again here.

Figure 9:
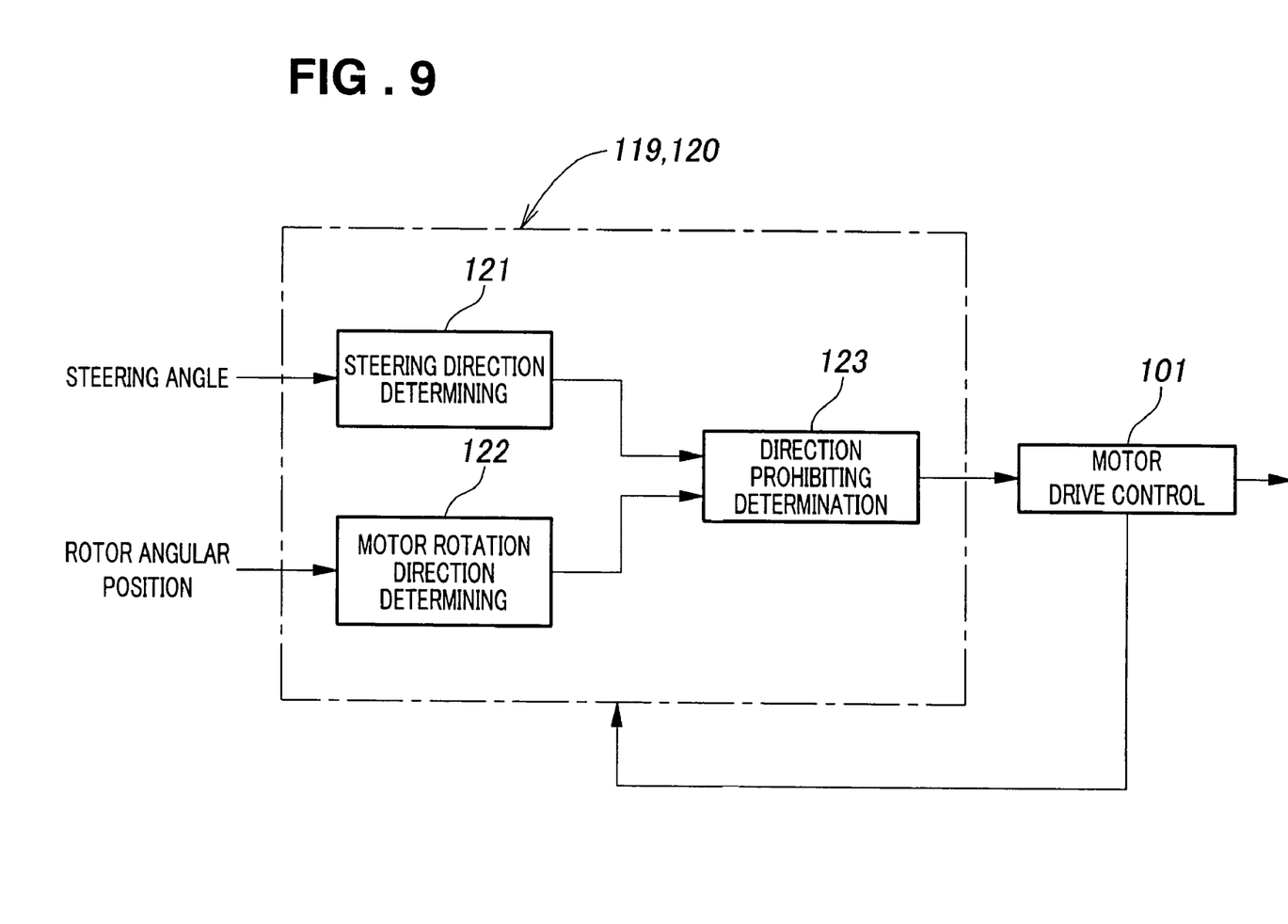
FIG. 9 is a block diagram of a direction prohibiting part shown in FIG. 8.

The first microcomputer 100 and the second microcomputer 111 respectively have direction prohibiting parts 120, 119 shown in FIG. 9.

The direction prohibiting parts 119, 120 output to the motor drive control part 101 a 1 signal when the steering direction and the motor rotation direction are not the same and a zero signal when the steering direction and the motor rotation direction are the same. When the signals from the direction prohibiting parts 119, 120 are zero the motor drive control part 101 remains in the same state and when the input from either of the direction prohibiting parts 119, 120 is 1 it controls the output of the brushless motor 19 to zero.

Because the direction prohibiting parts 119, 120 are of the same construction, only the direction prohibiting part 119 will be described, with reference to FIG. 9.

The direction prohibiting part 119 shown in FIG. 9 has a steering direction determining part 121, a motor rotation direction determining part 122, and a direction prohibiting determination part 123.

The steering direction determining part 121 detects the steering direction from the signal inputted from a steering angle sensor, and for example outputs 1 if it is right-turn and outputs 0 if it is left-turn.

The motor rotation direction determining part 122 detects the rotation direction of the rotor from the rotor angular position calculated by the second microcomputer 111, and outputs a 1 signal when steering is being assisted in the right-turn direction and outputs an 0 signal when steering is being assisted in the left-turn direction.

The direction prohibiting determination part 123 inputs the signal from the steering direction determining part 121 and the signal outputted from the motor rotation direction determining part 122, and when these signals are the same infers that all is normal and outputs a normal value signal, for example an 0 signal, to the motor drive control part 101. When the signals are not the same, it infers that all is not normal and outputs an abnormality signal, for example a 1 signal, to the motor drive control part 101. When it receives a 1 signal outputted from the direction prohibiting part 119, the motor drive control part 101 controls the output of the brushless motor 19 to zero.

Figure 10:
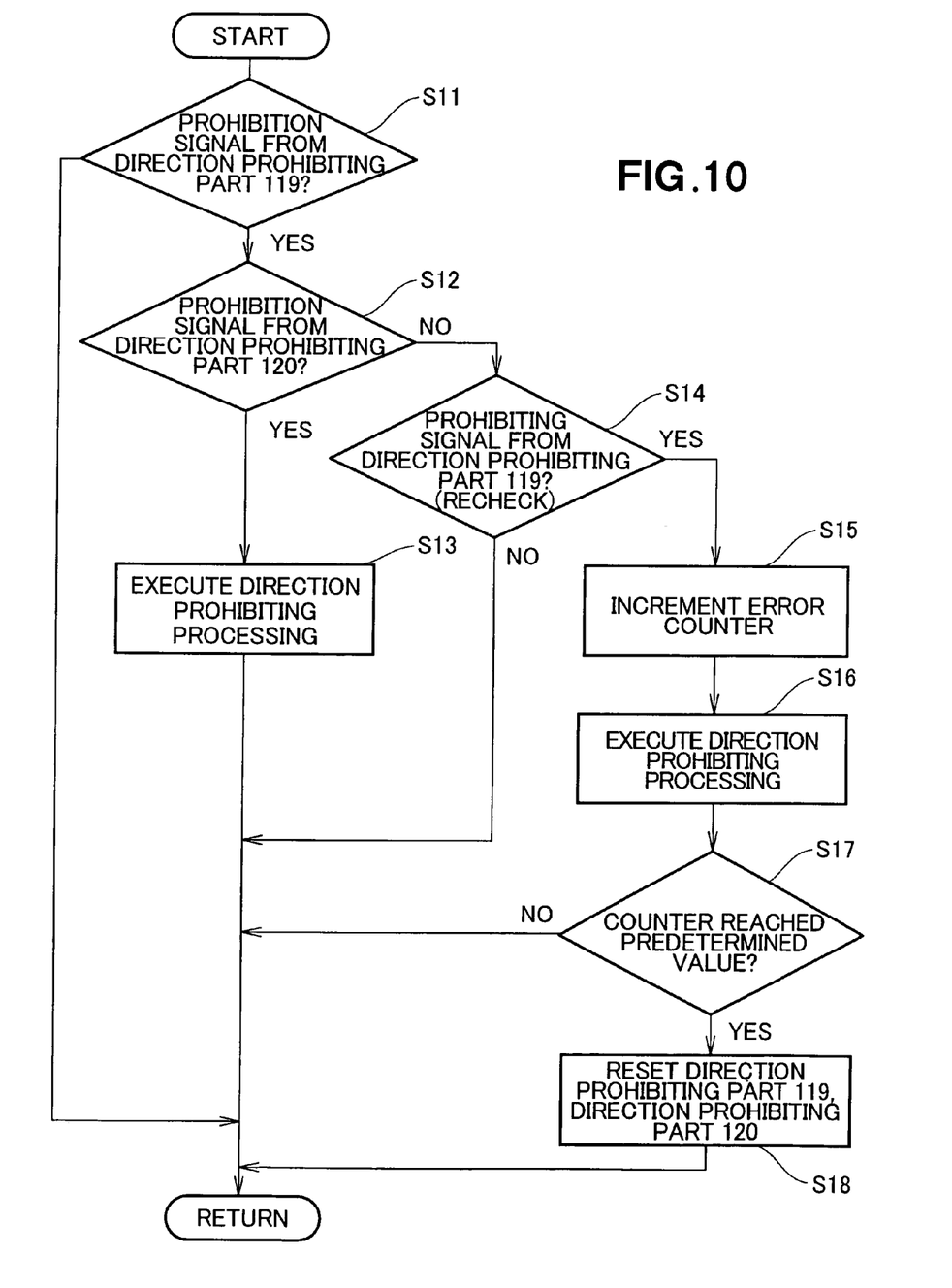
FIG. 10 is a flow chart illustrating control of a motor drive control part based on a signal from the direction prohibiting part.

Now, control of the motor drive control part 101 shown in FIG. 9 will be described, using the flow chart shown in FIG. 10.

When the ignition switch is turned on, the control flow of the motor drive control part 101 starts.

Step (hereinafter, S) 11: It is determined whether or not there is a direction prohibiting signal from the direction prohibiting part 119, and when there is no direction prohibiting signal processing returns and normal motor control is carried out, and when there is a direction prohibiting signal processing proceeds to S12.

S12: It is determined whether or not there is a direction prohibiting signal from the direction prohibiting part 120, and when there is a direction prohibiting signal from the direction prohibiting part 120 processing proceeds to S13, and when there is none processing proceeds to S14.

S13: Direction prohibiting processing is executed.

S14: It is rechecked whether or not there is a direction prohibiting signal from the direction prohibiting part 119. If there is no direction prohibiting signal, processing returns and normal motor control is carried out, and if there is a direction prohibiting signal, processing proceeds to S15.

S15: An error counter (n1ot shown) in the motor drive control part 101 increments by 1, and then processing proceeds to S16.

S16: Direction prohibiting processing is executed and then processing proceeds to S17.

S17: It is determined whether or not the count value of the error counter of the motor drive control part 101 has reached a predetermined value, and if the count value is smaller than the predetermined value processing returns and normal motor control is carried out, and if the count value has reached the predetermined value processing proceeds to S18.

S18: When the count value has reached the predetermined value, it is inferred that an abnormality has arisen in one or the other of the direction prohibiting parts 119, 120, a reset signal is sent to the direction prohibiting parts 119, 120, and the direction prohibiting parts 119, 120 are reset.

Here a construction is being used such that the direction prohibiting part 119 is assumed to be normal and the error counter counts up when the signal from the direction prohibiting part 120 disagrees with the signal from the direction prohibiting part 119, but alternatively it may count when the signal from the direction prohibiting part 119 disagrees with the signal from the direction prohibiting part 120. Alternatively, a construction may be adopted wherein the signals from the direction prohibiting part 119 and the direction prohibiting part 120 are compared using an OR circuit.

By this means, it is possible to continue control of the electric power steering apparatus normally without comparing signals with angle comparing means or the like; that is, without detecting abnormality of the two microcomputers.

Next, a control unit of an electric power steering apparatus according to a fourth preferred embodiment of the invention will be described, on the basis of FIG. 11. The control unit 22c of this fourth preferred embodiment, as in the second preferred embodiment shown in FIG. 7, includes two microcomputers. Parts the same as parts in the control unit 22 of the first preferred embodiment shown in FIG. 5 have been given the same reference numerals and will not be described again here.

Figure 11:
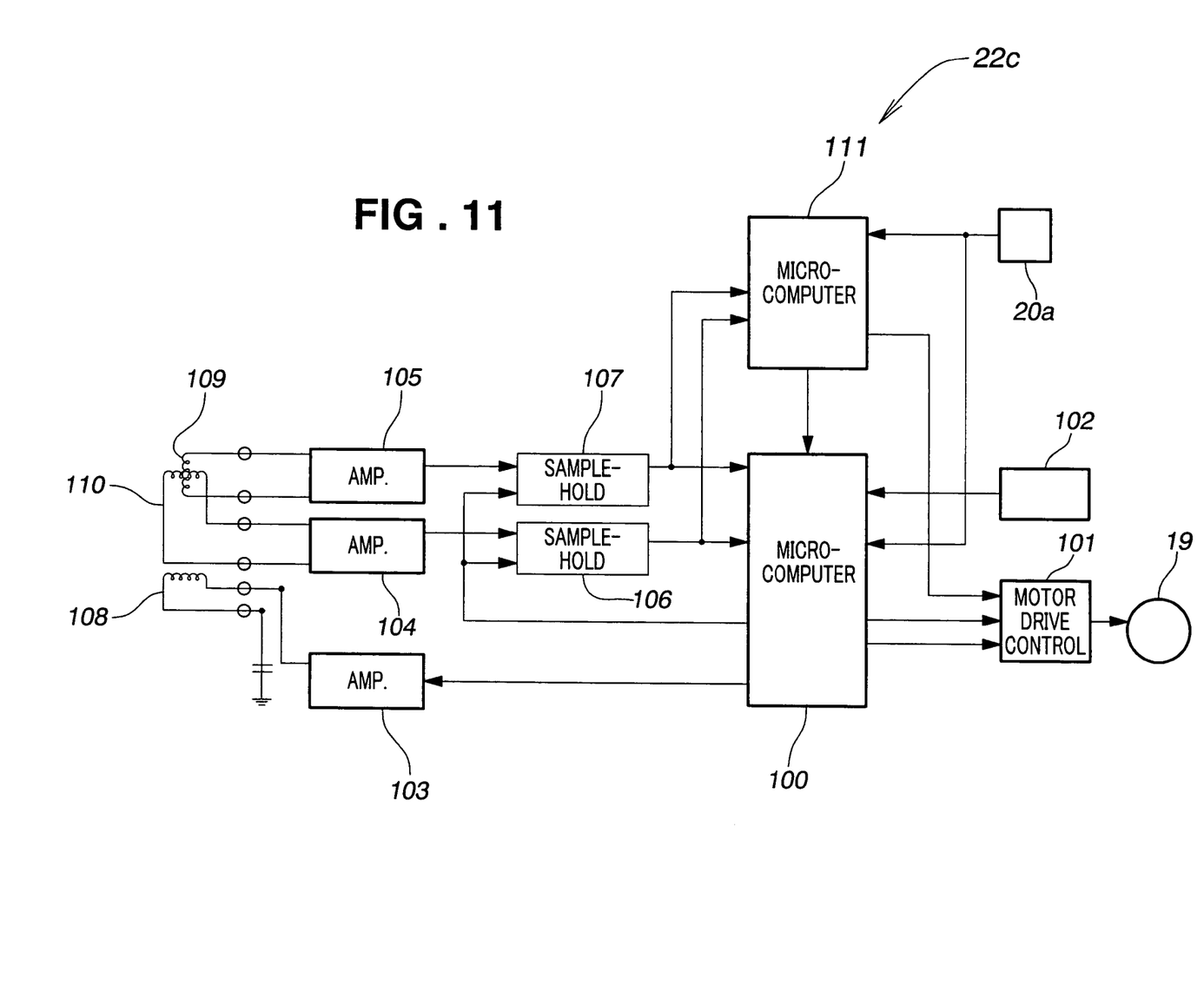
FIG. 11 is an electrical block diagram of a control device in an electric power steering apparatus according to a fourth preferred embodiment of the invention.

The control unit 22c of the fourth preferred embodiment shown in FIG. 11 may have an angle comparing part or direction prohibiting parts (not shown), but since these have already been described in the foregoing preferred embodiments they will not be described again here.

A reference signal (voltage) and a reference clock pulse for example expressed as sin ωt (ω: angular frequency, t: time) are applied to the exciting coil 108 from the first microcomputer 100 via the amplifier 103. This reference clock pulse provides an excitation signal timing.

When the reference signal is inputted to the exciting coil 108 from the first microcomputer 100, the sin output coil 109 and the cos output coil 110 output a sin signal (voltage) expressed by sin ((ωt-θ) and a cos signal (voltage) expressed by cos (ωt-θ).

The sin signal from the sin output coil 109 and the cos signal from the cos output coil 110 are amplified by the respective amplifying parts 105, 104 and then sample-held by the sample-hold circuits 107, 106 and inputted to the first and second microcomputers 100, 111.

The sample-hold timing with which the sample-holding is carried out is determined by a signal from the first microcomputer 100. The reference clock pulse to the resolver is outputted so that this sample-hold timing and the peak of the excitation signal synchronize correctly.

The first microcomputer 100 has for example a CPU, RAM and ROM. A relationship between values (digital values) of the sin signal and the cos signal and the rotor angular position θ is stored in the ROM in the form of a table. The first microcomputer 100 refers to the reference signal outputted to the exciting coil 108, outputs sample-hold timing synchronized with the reference dock pulse, samples the signal outputted from the sin output coil 109 and the signal outputted from the cos output coil 110 with the sample-hold circuits, and A/D-converts them to obtain a sin signal and a cos signal. It then refers to the table stored in ROM and reads out a rotor angular position θ corresponding to the instantaneous values of the sin signal and the cos signal. In this way, the rotor angular position θ of the motor is calculated.

The second microcomputer 111, like the first microcomputer 100, has for example a CPU, RAM and ROM. A relationship between values (digital values) of the sin signal and the cos signal and the rotor angular position θ is stored in the ROM in the form of a table. The second microcomputer 111 samples the signal outputted from the sin output coil 109 and the signal outputted from the cos output coil 110 with the sample-hold circuits and A/D-converts them to obtain a sin signal and a cos signal. It then refers to the table stored in ROM and reads out a rotor angular position θ corresponding to the instantaneous values of the sin signal and the cos signal.

Thus, in this preferred embodiment, because sample-hold circuits for sample-holding the outputs from the resolver are provided, and the first control means (the first microcomputer 100) or the second control means (the second microcomputer 111) outputs a reference clock pulse to the resolver and a sample-hold timing pulse to the sample-hold circuits, a sample-hold tuning correctly synchronized with the peaks of the excitation signal can be outputted. Also, it becomes possible for the timing to be changed freely with the sample-hold timing remaining synchronized correctly with the peaks of the excitation signal.

Although in the first preferred embodiment and the second preferred embodiment constructions were described wherein the microcomputers do not have direction prohibiting parts, in the first preferred embodiment and the second preferred embodiment it is also possible to adopt constructions wherein the microcomputers do have direction prohibiting parts.

Obviously, various minor changes and modifications of the present invention are possible in the light of the above teaching. It is therefore to be understood that within the scope of the appended claims the invention may be practiced otherwise than as specifically described.

What is claimed is:

1. An electric power steering apparatus comprising:
   a brushless motor for applying a torque to a steering mechanism;
   a motor angular position detecting means for detecting an angular position of a rotor of the brushless motor;
   steering input detecting means for detecting a steering input;
   control means for calculating a target current on the basis of at least a signal from the steering input detecting means; and
   motor driving means for supplying current to the brushless motor,
   wherein the calculation of the angular position of the rotor of the brushless motor is carried out with reference to a predetermined table provided in the control means.

2. An electric power steering apparatus according to claim 1, further comprising second control means additional to the first control means, wherein the second control means performs the same motor angular position calculation as the first control means and an abnormality is detected by a value calculated by the first control means and a value calculated by the second control means being compared.

3. An electric power steering apparatus according to claim 1, further comprising second control means additional to the first control means, wherein the second control means performs the same motor angular position calculation as the first control means and the first control means and the second control means have direction prohibiting means for restricting rotation of the brushless motor on the basis of a steering input of a driver.

4. An electric power steering apparatus according to claim 1, wherein the motor angular position detecting means is a resolver and there are further provided sample-hold circuits for sample-holding outputs from the resolver and the first control means outputs a reference clock pulse to the resolver and a sample-hold timing pulse to the sample-hold circuits.

5. An electric power steering apparatus according to claim 2, wherein the motor angular position detecting means is a resolver and there are further provided sample-hold circuits for sample-holding outputs from the resolver and the first control means or the second control means outputs a reference clock pulse to the resolver and a sample-hold timing pulse to the sample-hold circuits.

* * * * *